(12) United States Patent
Birman et al.

(10) Patent No.: US 9,937,849 B2
(45) Date of Patent: Apr. 10, 2018

(54) GAUGE 360 ILLUMINATION LIGHTGUIDE

(71) Applicant: Continental Automotive Systems, Inc., Auburn Hills, MI (US)

(72) Inventors: Vyacheslav Birman, Auburn Hills, MI (US); Christian Tanguy, Rochester Hills, MI (US); Daniel P Tollis, Novi, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 454 days.

(21) Appl. No.: 14/555,158

(22) Filed: Nov. 26, 2014

(65) Prior Publication Data

US 2015/0151668 A1 Jun. 4, 2015

Related U.S. Application Data

(60) Provisional application No. 61/910,481, filed on Dec. 2, 2013.

(51) Int. Cl.
*B60Q 1/00* (2006.01)
*G01D 13/26* (2006.01)
*G01D 11/28* (2006.01)
*G01D 13/02* (2006.01)

(52) U.S. Cl.
CPC ........... *B60Q 1/0017* (2013.01); *G01D 11/28* (2013.01); *G01D 13/02* (2013.01); *G01D 13/265* (2013.01)

(58) Field of Classification Search
CPC ....... B60Q 3/044; G01D 13/22; G01D 13/265
See application file for complete search history.

(56) References Cited

U.S. PATENT DOCUMENTS

| | | | |
|---|---|---|---|
| 5,047,761 A * | 9/1991 | Sell ...................... | B60Q 3/004 116/288 |
| 5,458,082 A * | 10/1995 | Cookingham ......... | B60Q 3/004 116/288 |
| 6,595,667 B1 | 7/2003 | Obata | |
| 7,458,695 B2 | 12/2008 | Birman et al. | |
| 7,758,195 B2 | 7/2010 | Feit | |
| 2004/0228104 A1 | 11/2004 | Birman | |
| 2006/0171137 A1 | 8/2006 | Tamaki | |
| 2011/0107959 A1 | 5/2011 | Guillauminaud | |

FOREIGN PATENT DOCUMENTS

| | | | |
|---|---|---|---|
| CN | 201592676 U | 9/2010 | |
| CN | 102865885 A | 1/2013 | |
| CN | 203082754 U | 7/2013 | |
| EP | 2543976 A1 | 1/2013 | |
| GB | 2015161 A * | 9/1978 | ............. G01D 11/28 |

* cited by examiner

*Primary Examiner* — Sharon Payne

(57) ABSTRACT

A gauge assembly includes a gauge surface and a light guide. The gauge surface includes a concave surface having an illuminable scale. The light guide forms a geometric shape corresponding to the concave surface of the gauge surface. The light guide has ends that curve away from the gauge surface to receive light.

12 Claims, 3 Drawing Sheets

GAUGE 360 ILLUMINATION LIGHTGUIDE

CROSS-REFERENCE TO RELATED APPLICATIONS

This application claims the benefit of U.S. Provisional Application No. 61/910,481 filed Dec. 2, 2013, the disclosure of which is hereby incorporated by reference in its entirety.

TECHNICAL FIELD

The present disclosure relates to vehicle instrument panels and clusters, and more specifically to a vehicle instrument panel that includes a light guide for illuminating a concave gauge surface.

BACKGROUND

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include instrument panels to communicate information indicative of operation to an operator. Motor vehicles include instrument panels with several gauges and dials that communicate vehicle conditions such as speed, engine rpm, temperature, and oil pressure along with many other operational parameters. A gauge surface can be illuminated to provide a desired aesthetic appearance. Planar light guides are typically utilized for propagating light to desired locations, however, light is not always even distributed.

SUMMARY

A light guide is provided that may provide light to a gauge surface for substantially 360 degrees about the axis of rotation of the pointer of a guage.

In one form, which may be combined with or separate from the other forms provided herein, a gauge assembly is provided that has a gauge surface including a concave surface having an illuminable scale. A light guide forms a geometric shape corresponding to the concave surface of the gauge surface. The light guide includes ends that curve away from the gauge surface to receive light.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
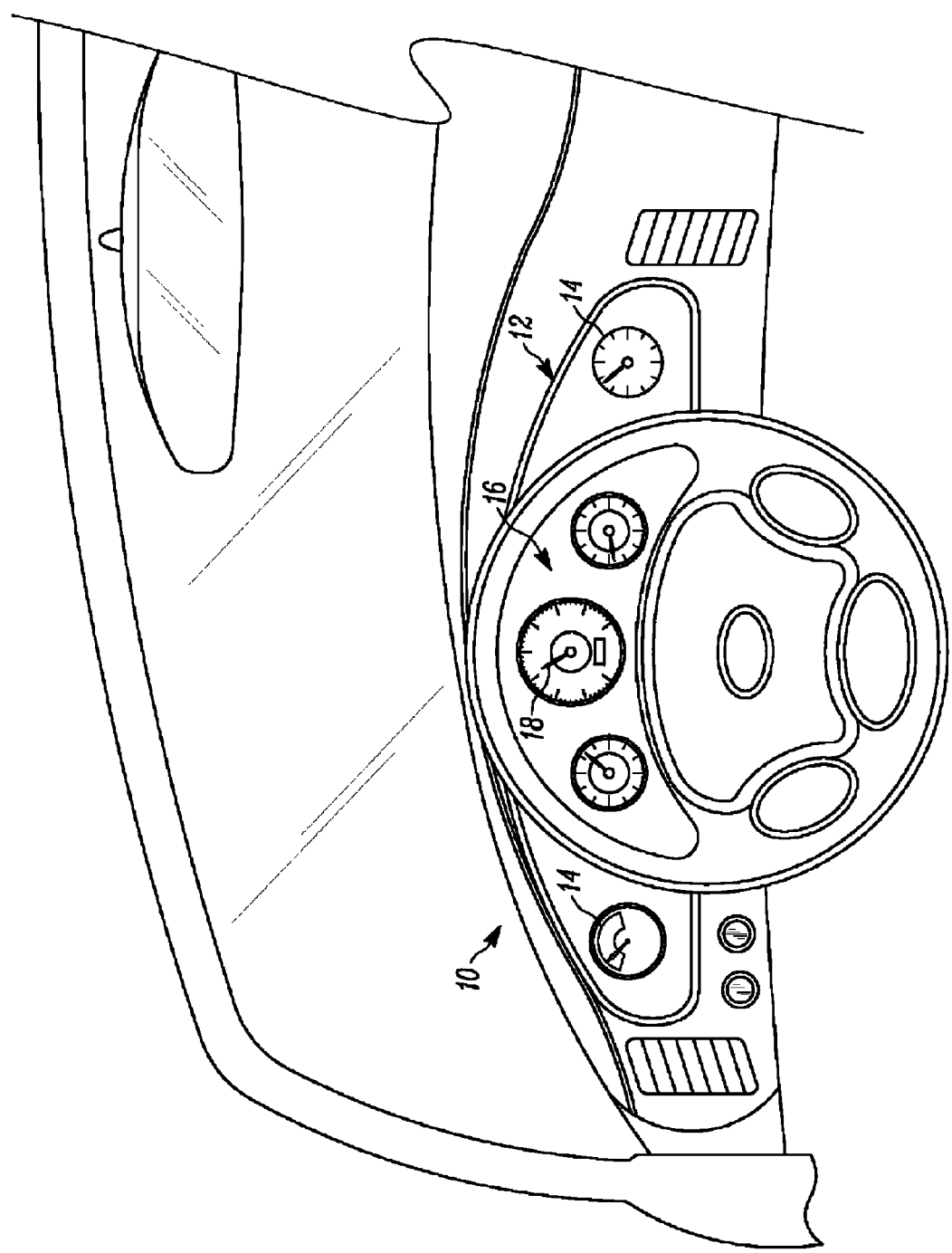
FIG. 1 is a schematic view of an example vehicle dashboard and instrument panel, according to the principles of the present disclosure.
Figure 2:
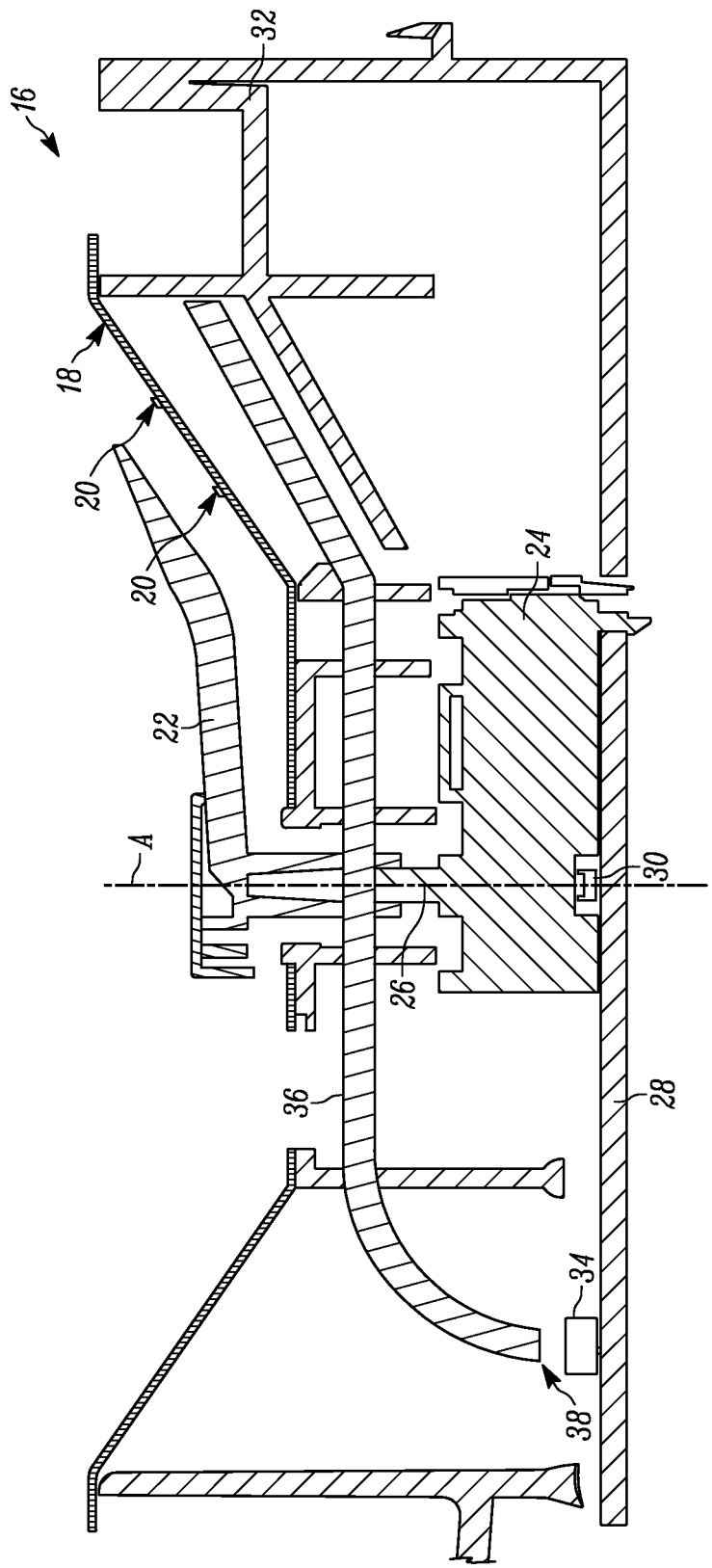
FIG. 2 is a cross-sectional view of an example gauge assembly of the instrument panel of FIG. 1, in accordance with the principles of the present disclosure.

Referring to FIGS. 1 and 2, a vehicle dashboard 10 is shown and includes an instrument panel 12 that includes a main gauge assembly 16 and accessory gauges 14. The main gauge assembly 16 includes a concave gauge surface 18 with a scale 20 that is illuminable. A light guide 36 is provided to enable illumination of the scale 20. Typical light guides are planer and are illuminated by a plurality of light sources disposed about an axis of the gauge surface 18. The light guide 36, however, is not disposed within a single plane.

The gauge assembly 16 includes a pointer 22 that rotates about the axis A to indicate a specific value on the scale 20. In this example, the gauge assembly 16 is a speedometer or tachometer supported within a housing 32; however, other gauges are also within the contemplation of this disclosure. The pointer 22 is supported on a shaft 26 driven by a stepper motor 24 mounted to a printed circuit board 28. A light source 30 is disposed along the axis A for illuminating the pointer 22. The light source 30 propagates light through the shaft 26. The example shaft 26 may be translucent, or may include an opening enabling light to propagate to the pointer 22. The scale 20 includes is illuminated by the light guide 38, which is disposed about the axis A and which receives light from a light source 34 mounted to the printed circuit board 28.

Referring to FIGS. 3-6, with continued reference to FIG. 2, the example light guide 36 provides substantial uniform illumination about 360 degrees of the gauge surface 18 utilizing light sources 34 mounted to the printed circuit board 28. The light sources 34 are light emitting diodes (LED), however other known light sources are within the contemplation of this disclosure. Several light sources 34 may be utilized to provide light into the light guide 36.

The example light guide 36 is fabricated from a transparent or transparent material such as PMMA in a geometric shape with a curvature corresponding to the concave gauge surface 18. Uniform illumination is provided at least in part by ribs 42 on a top surface 44 and surface roughness in desired locations on the light guide 36.

Light is supplied by the light sources 34 and enters the light guide 36 at ends 40. The ends 40 curve downward toward the light sources 34, and each end 40 defines a light receiving surface 38 exposed to and adjacent to the light sources 34. The light sources 34 are mounted to the printed circuit board 28. Light propagates through the curved concave shape of the light guide 36 about the axis A. Light is also transmitted into a gap 50 between the lower light receiving surfaces 38 of the light guide 36. The geometric shape of the light guide 36 propagates the light around the light guide 36.

Figure 4:
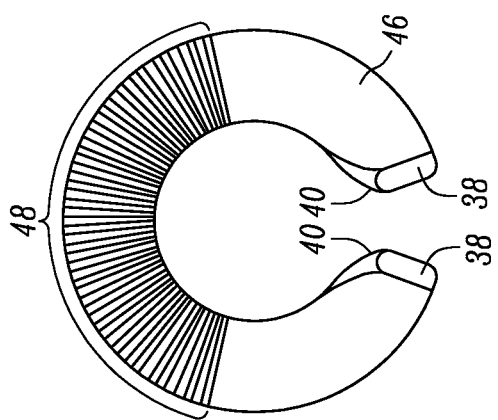
FIG. 4 is a bottom view of the example light guide of FIG. 3, in accordance with the principles of the present disclosure.
Figure 6:
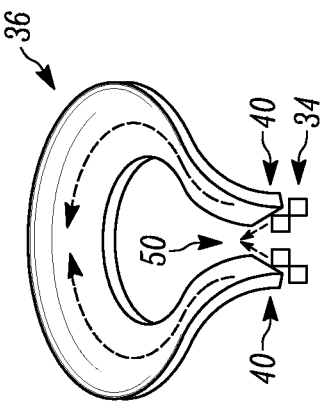
FIG. 6 is a perspective view of the example light guide of FIGS. 3-5, in accordance with the principles of the present disclosure.
Figure 3:
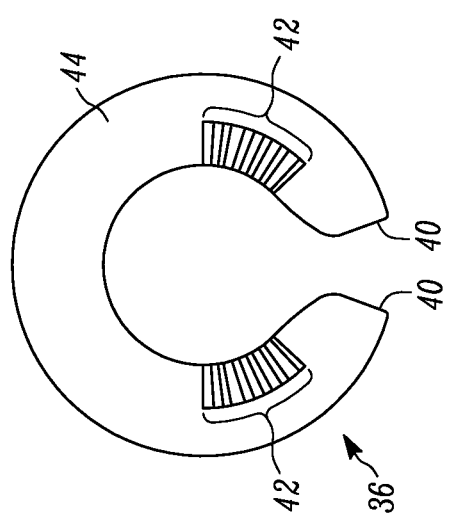
FIG. 3 is a top view of an example light guide of the gauge assembly of FIG. 2, according to the principles of the present disclosure.
Figure 5:
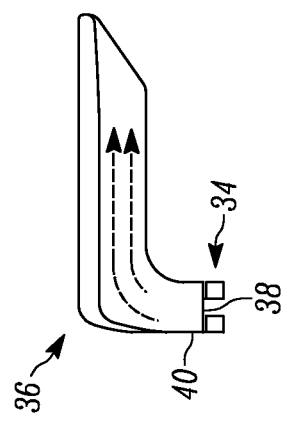
FIG. 5 is a side view of the example light guide of FIGS. 3-4, according to the principles of the present disclosure.

The light guide 36 includes ribs 48 disposed on a bottom surface 46 as shown in FIG. 4 to uniformly distribute light. The 48 are spaced apart from each other in a manner to direct light upward to illuminate the scale 20. Ribs 48 are also provided on the bottom surface of the light guide 36 to further aid in distributing light about the light guide 36. Moreover, a surface of the light guide 36 is provided with a roughness that evens illumination about the axis A. The light guide 36 is curved to correspond with the gauge surface 18, but is not parallel to the gauge surface 18.

Accordingly, the example light guide 36 uniformly illuminates a concave gauge scale 20 and surface with light sources 34 mounted to a printed circuit board 28.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gauge assembly comprising:
   a gauge surface including a concave surface having an illuminable scale; and
   a light guide comprising a truncated and sectioned substantially right-circular cone, (a truncated and sectioned cone) the truncated and sectioned cone having a base with a first radius of curvature and a top with a second radius of curvature, the second radius of curvature being less than the first radius of curvature, the truncated and sectioned cone also having a concave inner surface and a convex outer surface, sectioning of the truncated cone defining first and second ends, which are substantially planar, the opposing ends being curved away from each other in first and second directions relative to the base, the first and second directions being away from the base;
   a first light emitting diode proximate the first substantially planar end;
   a second light emitting diode proximate the second substantially planar end;
   wherein light emitted from the light emitting diodes enters the first and second substantially planar ends and is propagated completely around the truncated and sectioned cone.

2. The gauge assembly of claim 1, wherein the substantially planar ends are adjacent to each other.

3. The gauge assembly of claim 2, wherein the geometric shape of the light guide is nonparallel with the gauge surface.

4. The gauge assembly of claim 3, further comprising a pointer being configured to rotate about an axis of rotation, the light guide being disposed about the axis of rotation, the axis of rotation being circumscribed by the light guide.

5. The gauge assembly of claim 4, the light guide being configured to illuminate the illuminable scale of the gauge surface.

6. The gauge assembly of claim 1, further comprising a printed circuit board and a plurality of light guide light sources disposed on the printed circuit board, the light guide light sources being configured to emit light into the light guide.

7. The gauge assembly of claim 1, the ends defining a gap therebetween.

8. The gauge assembly of claim 6, further comprising a pointer light source disposed on the printed circuit board, the pointer light source being configured to emit light into the pointer.

9. The gauge assembly of claim 1, the light guide defining a plurality of ribs thereon.

10. The gauge assembly of claim 9, the light having surface roughness formed thereon.

11. The gauge assembly of claim 10, wherein a first portion of the plurality of ribs is located on the concave surface of the light guide and a second portion of the plurality of ribs is located on the convex surface of the light guide.

12. The gauge assembly of claim 1, the light guide being configured to illuminate the illuminable scale of the gauge surface.

* * * * *